US011016909B2

(12) United States Patent
Reed et al.

(10) Patent No.: US 11,016,909 B2
(45) Date of Patent: May 25, 2021

(54) CACHE PAGE RETENTION BASED ON PAGE COST

(71) Applicant: International Business Machines Corporation, Armonk, NY (US)

(72) Inventors: Thomas C. Reed, Tucson, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/551,585

(22) Filed: Aug. 26, 2019

(65) Prior Publication Data

US 2021/0064544 A1 Mar. 4, 2021

(51) Int. Cl.
*G06F 12/123* (2016.01)
*G06F 12/1009* (2016.01)

(52) U.S. Cl.
CPC ........ *G06F 12/124* (2013.01); *G06F 12/1009* (2013.01); *G06F 2212/1021* (2013.01); *G06F 2212/1041* (2013.01); *G06F 2212/304* (2013.01)

(58) Field of Classification Search
CPC ............................ G06F 12/124; G06F 12/1009
See application file for complete search history.

(56) References Cited

U.S. PATENT DOCUMENTS

| | | | |
|---|---|---|---|
| 9,402,058 B2 | 7/2016 | Takahashi | |
| 9,804,973 B1 | 10/2017 | Shalev | |
| 10,013,362 B2 | 7/2018 | Bedi et al. | |
| 10,229,161 B2 | 3/2019 | Kakarla et al. | |
| 2013/0198435 A1* | 8/2013 | Sandadi | G06F 12/126 711/103 |
| 2017/0168944 A1 | 6/2017 | van Greunen et al. | |
| 2017/0293571 A1* | 10/2017 | Al Sheikh | G06F 12/127 |
| 2018/0365451 A1* | 12/2018 | Ndu | G06F 21/72 |
| 2019/0057035 A1* | 2/2019 | Gao | G06F 3/061 |

FOREIGN PATENT DOCUMENTS

WO     WO2015200137 A1     12/2015

OTHER PUBLICATIONS

Duong, Nam, et al., "SCORE: A Score-Based Memory Cache Replacement Policy," Department of Computer Science, University of California, Irvine, Jun. 2016.

* cited by examiner

*Primary Examiner* — Ryan Bertram
*Assistant Examiner* — Edmund H Kwong
(74) *Attorney, Agent, or Firm* — Nelson and Nelson; Daniel P. Nelson

(57) ABSTRACT

A method for retaining data pages in a cache is disclosed. In one embodiment, such a method stores multiple data pages in a cache. The method calculates, for each data page, a cost associated with promoting the data page from persistent storage media to the cache. The cost takes into account any data transformations (decryption, decompression, etc.) that are needed to promote the data page from the persistent storage media to the cache. In certain embodiments, the cost is represented as a score that is assigned to each data page. The method retains each data page in the cache for an amount of time that is related to its cost, such that data pages with a higher cost are retained in the cache longer than data pages with a lower cost. A corresponding apparatus and computer program product are also disclosed.

20 Claims, 7 Drawing Sheets

CACHE PAGE RETENTION BASED ON PAGE COST

BACKGROUND

FIELD OF THE INVENTION

This invention relates to apparatus and methods for retaining pages in cache based on page cost.

BACKGROUND OF THE INVENTION

In the z/OS operating system, PDSE (partitioned data set extended) data sets are used to simply and efficiently organize related groups of sequential files, also referred to as "members." A PDSE data set consists of a directory and zero or more members. The directory contains an index which provides a fast search for members in the data set. PDSE data sets typically consist of a homogenous collection of four kilobyte data pages consisting of directory and member pages. The directory data pages make up a B-tree structure that is distributed throughout the data set while the member data pages form the remainder of the data set.

Current PDSE caching strategy typically treats all cached pages equally which is reasonable when PDSE pages only require uniform input/output (I/O) access to bring them into cache. In certain cases, data sets such as PDSE data sets may take advantage of hardware-accelerated features such as encryption and compression which changes the cost of bringing pages into cache. For example, storing a data page in cache that has been encrypted on underlying storage media (disk drives, solid state drives, etc.) may require decrypting the data page prior to storing it in cache. Similarly, storing a page in cache that has been compressed on underlying storage media may require decompressing the page prior to storing it in cache. In some cases, multiple data transformations (e.g., decryption, decompression, etc.) may be required to bring a page into cache. Such data transformations may add significant costs to promoting a data page to cache compared to promoting an uncompressed and/or non-encrypted data page to cache.

In view of the foregoing, what are needed are apparatus and methods to consider the cost of data transformations when determining how long to retain a page in cache. Such apparatus and methods will ideally reduce or minimize the frequency that costly data transformations (e.g., encryption/decryption, compression/decompression, etc.) need to be performed when promoting data pages to cache.

SUMMARY

The invention has been developed in response to the present state of the art and, in particular, in response to the problems and needs in the art that have not yet been fully solved by currently available apparatus and methods. Accordingly, apparatus and methods in accordance with the invention have been developed to retain data pages in a cache based on the cost of performing data transformations on the data pages. The features and advantages of the invention will become more fully apparent from the following description and appended claims, or may be learned by practice of the invention as set forth hereinafter.

Consistent with the foregoing, a method for retaining data pages in a cache is disclosed. In one embodiment, such a method stores multiple data pages in a cache. The method calculates, for each data page, a cost associated with promoting the data page from persistent storage media to the cache. The cost takes into account any data transformations (decryption, decompression, etc.) that are needed to promote the data page from the persistent storage media to the cache. In certain embodiments, the cost is represented as a score that is assigned to each data page. The method retains each data page in the cache for an amount of time that is related to its cost, such that data pages with a higher cost are retained in the cache longer than data pages with a lower cost.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
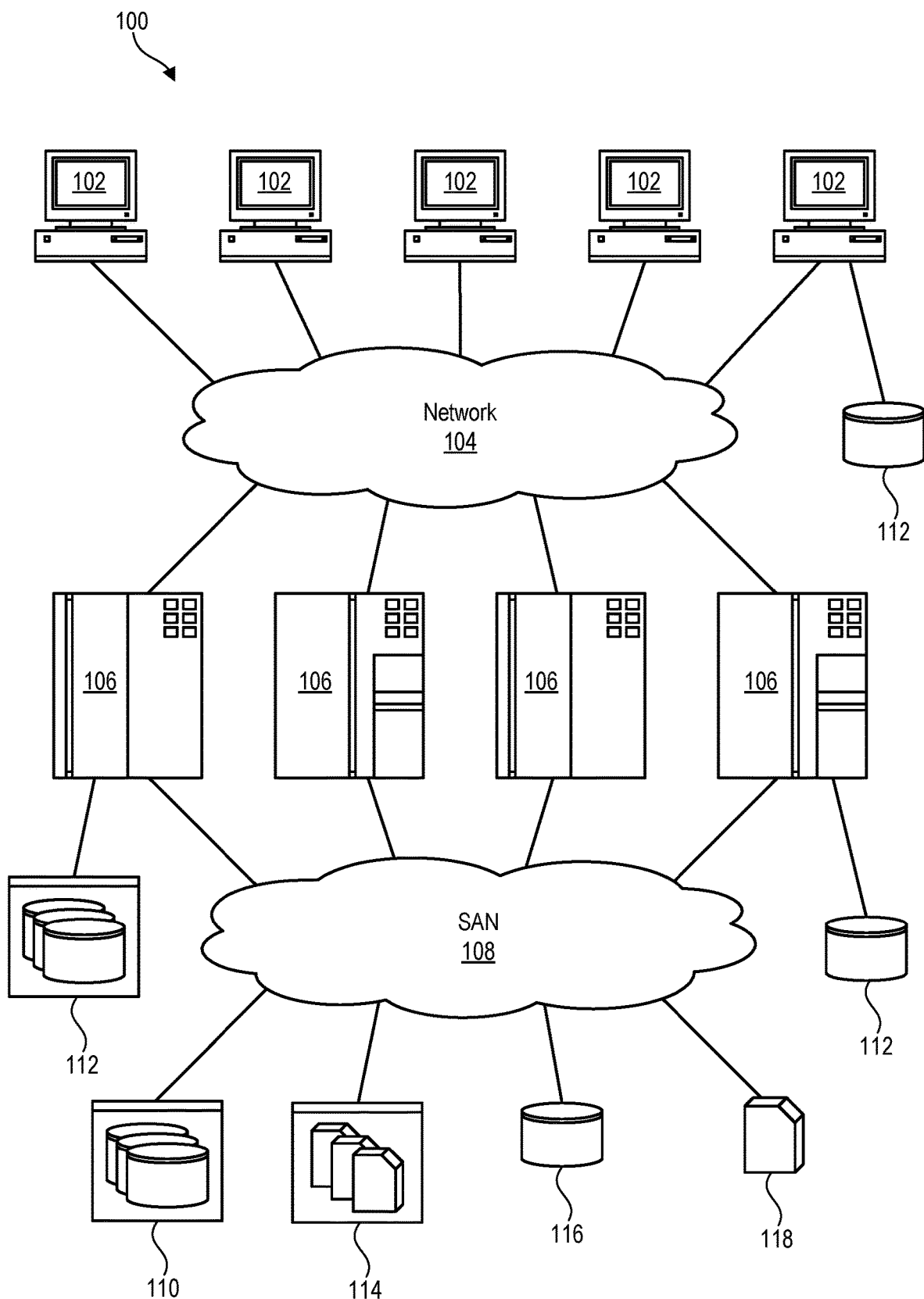
FIG. 1 is a high-level block diagram showing one example of a network environment in which apparatus and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer-readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where apparatus and methods in accordance with the invention may be utilized. The network environment 100 is presented by way of example and not limitation. Indeed, the apparatus and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as host systems 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host system 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
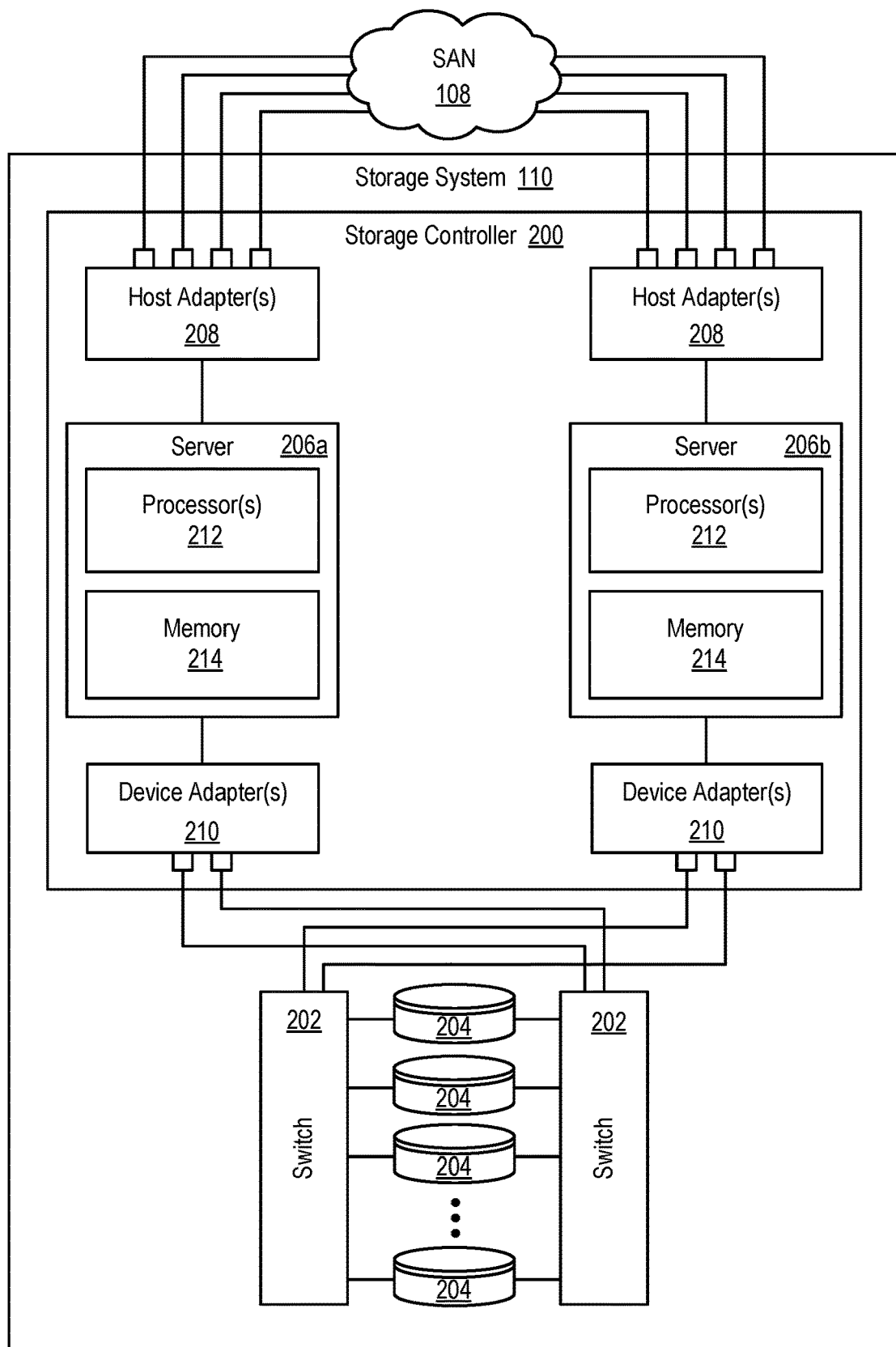
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host adapters 208 and device adapters 210 to connect the storage controller 200 to host devices 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
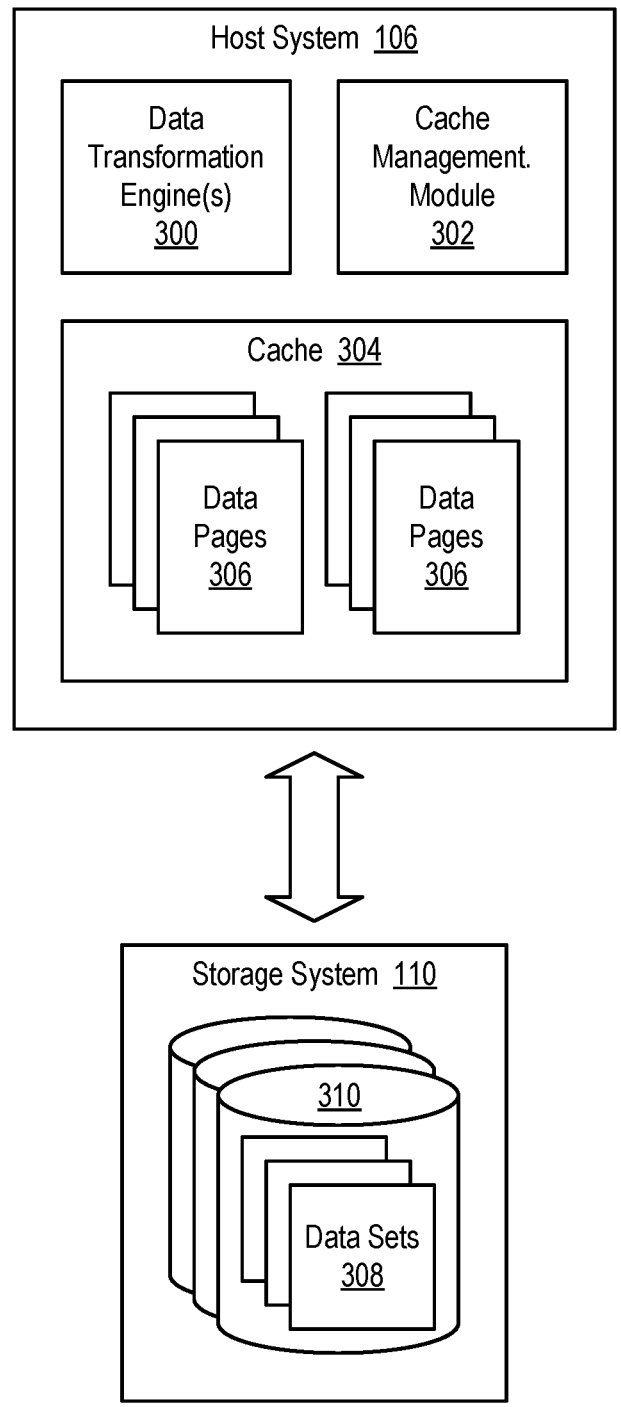
FIG. 3 is a high-level block diagram showing data pages stored in cache of a host system.

Referring to FIG. 3, as previously mentioned, in the z/OS operating system, PDSE (partitioned data set extended) data sets 308 are used to simply and efficiently organize related groups of sequential files, also referred to as "members." A PDSE data set 308 consists of a directory and zero or more members. The directory contains an index which provides a fast search for the members. PDSE data sets 308 typically consist of a homogenous collection of four kilobyte data pages 306 consisting of directory and member pages 306. The directory pages 306 make up a B-tree structure that is distributed throughout the data set 308 while the member data pages 306 form the remainder of the data set 308.

Current PDSE caching strategy typically treats all cached data pages 306 equally which is reasonable when PDSE data pages 306 only require uniform input/output (I/O) access to bring them into cache 304. In certain cases, data sets such as PDSE data sets 308 may take advantage of hardware-accelerated features such as encryption and compression which changes the cost of bringing data pages 306 into the cache 304. For example, storing a data page 306 in the cache 304 that has been encrypted on underlying storage media 204 (disk drives, solid state drives, etc.) may require decrypting the data page 306 prior to storing it in the cache 304. Similarly, storing a data page 306 in the cache 304 that has been compressed on underlying storage media 204 may require decompressing the data page 306 prior to storing it in the cache 304. In some cases, multiple data transformations (e.g., decryption, decompression, etc.) may be needed to bring a data page 306 into the cache 304. Such data transformations (e.g., encryption, compression, etc.) may add significant costs to storing a data page 306 in cache 304 compared to promoting an uncompressed and/or non-encrypted data page 306 to cache 304.

Despite the varying costs of promoting different data pages 306 into cache 304, the cost is typically not taken into account when deciding how long to retain data pages 306 in the cache 304. As a result, data pages 306 may be evicted from cache 304 on the same schedule and using the same criteria regardless of the costs of bringing the data pages 306 into the cache 304. This may result in various inefficiencies. For example, if a costly data page 306 is evicted from cache 304 and is needed again in cache 304 in response to an I/O request, costly data transformation operations (e.g., encryption, compression, etc.) may need to be repeated on the data page 306 to store it in the cache 304.

In view of the foregoing, apparatus and methods are needed that consider cost when determining how long to retain a data page 306 in cache 304. Such apparatus and methods will ideally reduce or minimize the frequency that costly data transformations (e.g., encryption/decryption, compression/decompression, etc.) need to be performed on data pages 306 when storing such data pages 306 in the cache 304.

FIG. 3 is a high-level block diagram showing data pages 306 of various data sets 308 (e.g., PDSE or other types of data sets 308) stored in cache 304 of a host system 106. The data sets 308 may reside in logical volumes 310 that are implemented on the storage drives 204 previously described. For the purposes of this disclosure, a "data set 308" is defined as a named collection of data or records. A PDSE data set 308 is one type of data set 308. However, apparatus and methods in accordance with the invention are not limited to PSDE data sets 308.

A cache management module 302 on the host system 106 may promote data pages 306 from the logical volumes 310 to the cache 304 in response to I/O operations, and eventually evict the same data pages 306 from the cache 304 when they have not been accessed for some amount of time and/or space is needed in the cache 304. Prior to storing a data page 306 in the cache 304, one or more data transformation engines 300 may, in certain cases, transform the data page 306. For example, if the data page 306 is encrypted on underlying storage media 204, a data transformation engine 300 may decrypt the data page 306 prior to it being stored in the cache 304. Similarly, if the data page 306 is compressed on underlying storage media 204, a data transformation engine 300 may decompress the data page 306 prior to it being stored in the cache 304. In certain cases, multiple data transformations may be needed prior to storing a data page 306 in the cache 304. Each of these data transformations may have a cost in terms of time and resources associated therewith. The cost may vary based on the type or generation of the data transformation engine 300 that is being used, as well as the type of data transformation that is being performed (e.g., whether the data transformation is decryption or decompression, for example). Subsequent generations of data transformation engines 300 may work more efficiently and thereby reduce the cost associated with performing certain data transformations.

Figure 4:
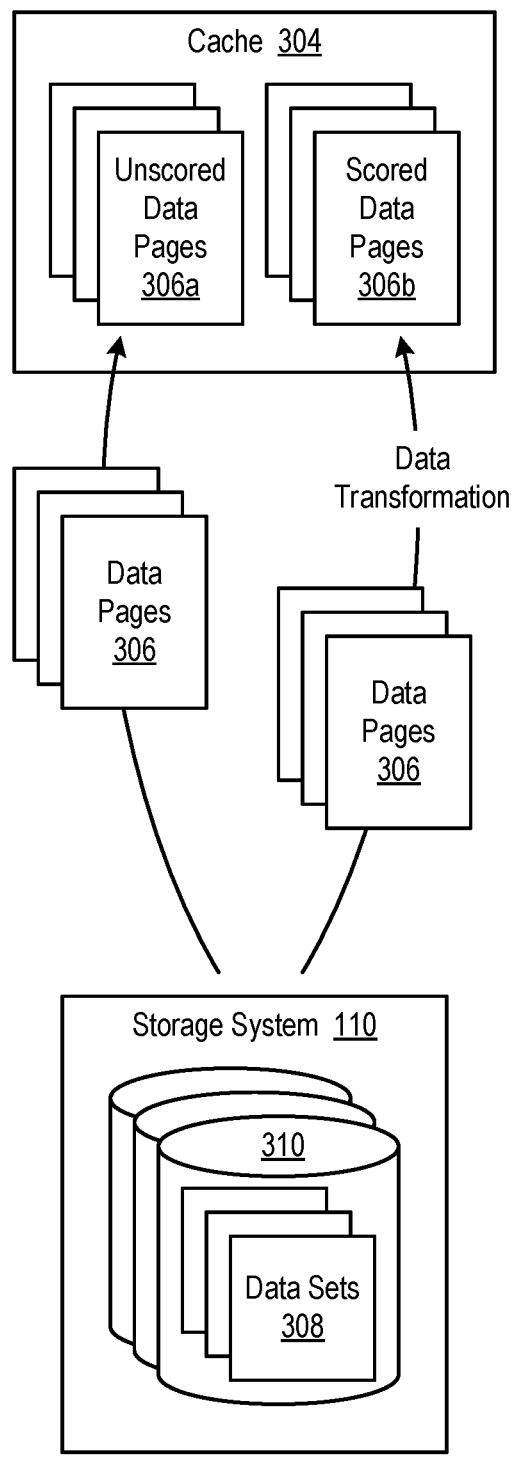
FIG. 4 is a high-level block diagram showing scored data pages and unscored data pages stored in cache.

Referring to FIG. 4, in order to track the cost of promoting certain data pages 306 from the storage system 110 to the cache 304, apparatus and methods in accordance with the invention may generate a score for each data page 306 in the cache 304. Data pages 306 that do not require any type of data transformation prior to being stored in the cache 304 may be referred to as "unscored data pages 306a," whereas data pages 306 that require some type of data transformation prior to being stored in the cache 304 may be referred to as "scored data pages 306b." In certain embodiments, unscored data pages 306a may be data pages 306 with a score of zero or a score that reflects that no data transformations are performed thereon. Each data page's score may reflect the cost of promoting the respective data page 306 from the storage system 110 to the cache 304.

Figure 5:
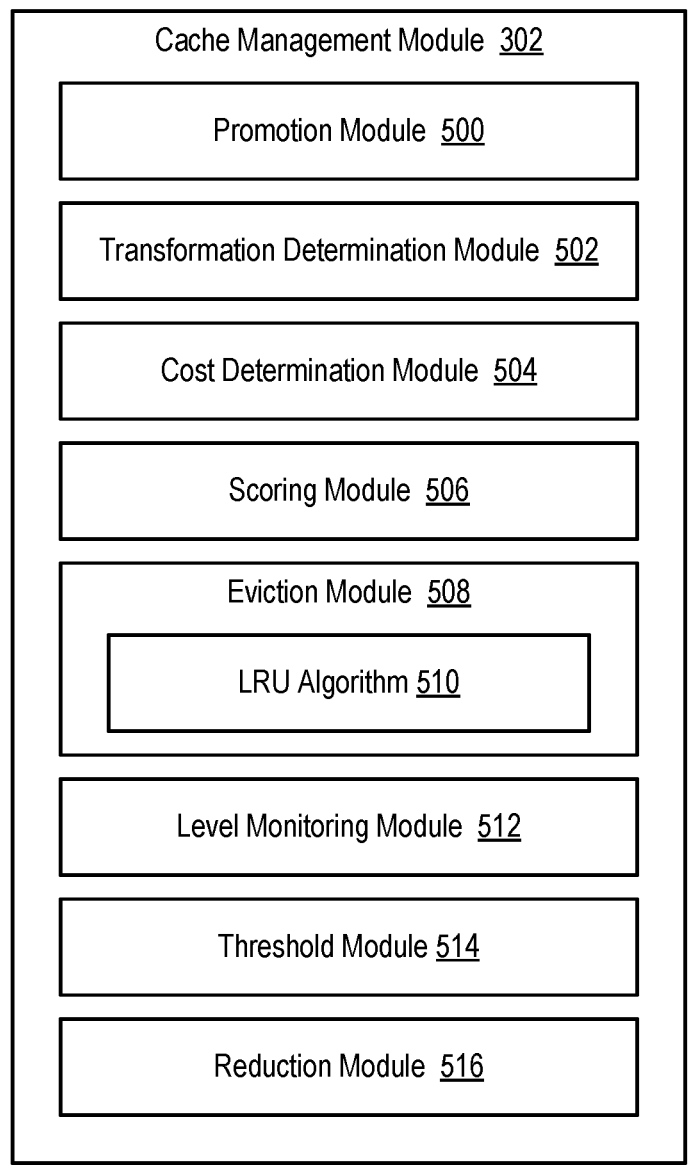
FIG. 5 is a high-level block diagram showing various sub-modules within a cache management module in accordance with the invention.

Referring to FIG. 5, in certain embodiments, a cache management module 302 in accordance with the invention may take cost into account when deciding how long to retain particular data pages 306 within a cache 304. FIG. 5 shows one embodiment of a cache management module 302 and various associated sub-modules. The cache management module 302 and associated sub-modules may be implemented in hardware, software, firmware, or combinations thereof. The cache management module 302 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the cache management module 302 includes one or more of a promotion module 500, transformation determination module 502, cost determination module 504, scoring module 506, eviction module 508, level monitoring module 512, threshold module 514, and reduction module 516.

The promotion module 500 may be configured to promote data pages 306 from persistent storage media 204 to the cache 304. This may occur in response to I/O that is directed to the data pages 306. As previously mentioned, some data sets 308 may be encrypted and/or compressed on the storage media 204. In such cases, promoting the data pages 306 may include transforming the data pages 306 (i.e., decrypting and/or decompressing the data pages 306) before storing the data pages 306 in the cache 304.

When data pages 306 are promoted to the cache 304, the transformation determination module 502 may determine what types of transformations, if any, have been performed on the data pages 306. For example, the transformation determination module 502 may determine if the data pages 306 have been decrypted, decompressed, or the like. In certain cases, the type of data transformation that is applied to a data page 306 may be determined by reading metadata associated with the data set 308 from which the data page 306 originates. This metadata, for example, may indicate whether the data set 308 is encrypted and/or compressed.

The cost determination module 504, by contrast, may determine a cost associated with the data transformation. In certain embodiments, the cost may depend on the type of hardware and/or software that was used to perform the data transformation, as well as a generation or version of the hardware and/or software. Newer generations or versions of hardware and/or software may be more efficient at performing certain data transformations and thus may have lower costs. In certain embodiments, each generation or version of hardware and/or software that is used to perform a data transformation may have a certain cost when transforming a data page 306.

Once costs to perform one or more data transformation on a data page 306 are determined, the scoring module 506 may generate a score for the data page 306 that reflects the costs. The eviction module 508 may use this score to determine how long to retain a data page 306 in cache 304 before it is evicted. In general, data pages 306 with higher scores will be retained in cache 304 longer than data pages 306 with lower scores. This will preserve in cache 304 data pages 306 that have had costly data transformations performed thereon. This, in turn, will prevent having to repeat the same data transformations on the data pages 306 in the event the data pages 306 are accessed again.

As shown in FIG. 5, the eviction module 508 may utilize a least recently used (LRU) algorithm 510 to determine when to evict data pages 306 from cache 304. This LRU algorithm 510 may be configured to retain data pages 306 in cache 304 in accordance with and in proportion to their scores. That is, data pages 306 with higher scores will be retained in cache 304 longer than data pages 306 with lower scores. For data pages 306 with the same or similar scores, the LRU algorithm 510 will evict the least recently used data pages 306 first.

In certain embodiments, the cache management module 302 may include functionality to ensure that scored data pages 306b do not dominate space in the cache 304 to the detriment of unscored data pages 306a. Because unscored data pages 306a may, in certain cases, make up the bulk of I/O in many systems, functionality may be provided to ensure that unscored data pages 306a are not prematurely forced out of the cache 304 due to the prevalence of scored data pages 306b therein.

To accomplish this, a level monitoring module 512 may, in certain embodiments, be configured to monitor a current utilization level 602 of the cache 304. The utilization level 602 indicates how much of the overall storage capacity of the cache 304 is being used. The threshold module 514 may compare this utilization level 602 to a high watermark 600 established for the cache 304. For example, the high watermark 600 may be set at ninety percent of the overall storage capacity of the cache 304. When the utilization level 602 reaches the high watermark 600, a reduction module 516 may reduce the effect that cost has on data page retention in the cache 304. That is, some scored data pages 306b may be treated like unscored data pages 306a in terms of retention times when the utilization level 602 is at or above the high watermark 600.

Figure 6A:
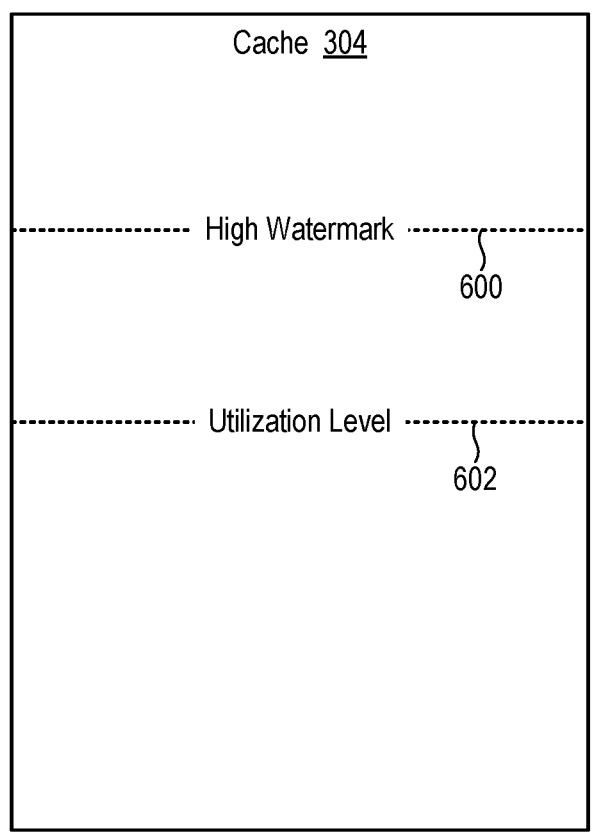
FIG. 6A is a high-level block diagram showing a utilization level that is below a high watermark in cache.
Figure 6B:
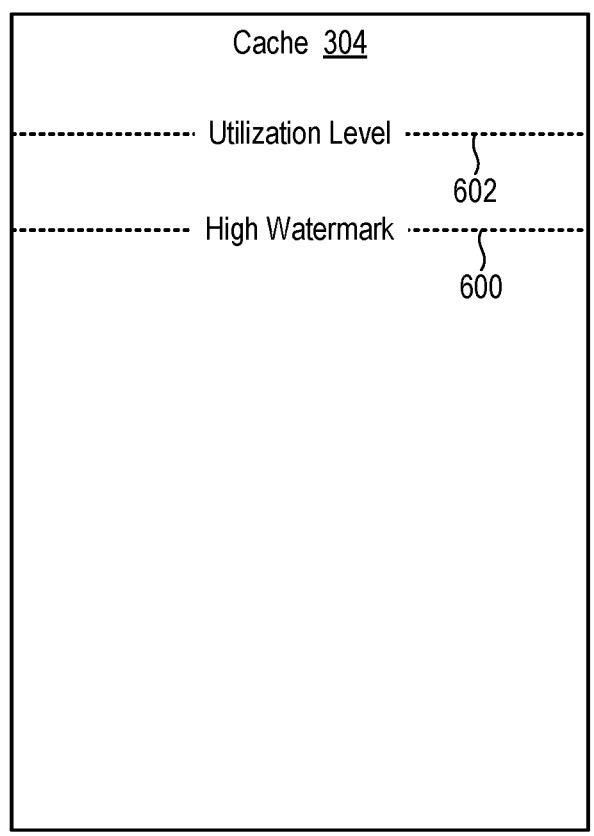
FIG. 6B is a high-level block diagram showing a utilization level that is above a high watermark in cache.

For example, in one embodiment, if the utilization level 602 is below the high watermark 600, as shown in FIG. 6A, data pages 306 may retained in cache 304 for an amount of time that is proportional to or directly related to their scores. However, if the utilization level 602 is above the high watermark 600, as shown in FIG. 6B, a cutoff value may be used with certain scored data pages 306b so that these scored data pages 306b are treated like unscored data pages 306a. For example, if a cutoff value of fifty percent is used, then scored data pages 306b with a score that is fifty percent or less of the scored data page 306b with the highest score may be treated in the same way as unscored data pages 306a. That is, these scored data pages 306b may not be purposely retained in cache 304 any longer than unscored data pages 306a. In a scenario where the utilization level 602 is above the high watermark 600 and the cache 304 has reached an allocation limit (i.e., the cache 304 is unable to grow in size any further), a cutoff value of one hundred percent may be used. That is, all scored data pages 306b will be treated the same way as unscored data pages 306a in terms of retention times. This will enable space to be more easily cleared in the cache 304.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for retaining data pages in a cache, the method comprising:
    storing a plurality of data pages in a cache;
    calculating, for each data page of the plurality of data pages, a cost associated with promoting the data page from persistent storage media to the cache, the cost taking into account any data transformation that is needed to promote the data page from the persistent storage media to the cache;
    retaining each data page in the cache for an amount time that is associated with its cost; and
    as the cache fills, reducing the effect that the cost has on data page retention in the cache.

2. The method of claim 1, wherein the data transformation includes at least one of encryption and decryption.

3. The method of claim 1, wherein the data transformation includes at least one of compression and decompression.

4. The method of claim 1, wherein the cost associated with each data page is represented as a score for each data page.

5. The method of claim 1, wherein data pages with a higher cost are retained in the cache longer than data pages with a lower cost.

6. The method of claim 1, further comprising, as the cache fills to a threshold, reducing the effect that cost has on the amount of time that data pages are retained in the cache.

7. The method of claim 1, further comprising utilizing a least recently used (LRU) algorithm to determine how long data pages are retained in the cache, the LRU algorithm taking into account the cost of the data pages.

8. A computer program product for retaining data pages in a cache, the computer program product comprising a non-transitory computer-readable storage medium having computer-usable program code embodied therein, the computer-usable program code configured to perform the following when executed by at least one processor:
    store a plurality of data pages in a cache;
    calculate, for each data page of the plurality of data pages, a cost associated with promoting the data page from persistent storage media to the cache, the cost taking into account any data transformation that is needed to promote the data page from the persistent storage media to the cache;
    retain each data page in the cache for an amount time that is associated with its cost; and
    as the cache fills, reduce the effect that the cost has on data page retention in the cache.

9. The computer program product of claim 8, wherein the data transformation includes at least one of encryption and decryption.

10. The computer program product of claim 8, wherein the data transformation includes at least one of compression and decompression.

11. The computer program product of claim 8, wherein the cost associated with each data page is represented as a score for each data page.

12. The computer program product of claim 8, wherein data pages with a higher cost are retained in the cache longer than data pages with a lower cost.

13. The computer program product of claim 8, wherein the computer-usable program code is further configured to, as the cache fills to a threshold, reduce the effect that cost has on the amount of time that data pages are retained in the cache.

14. The computer program product of claim 8, wherein the computer-usable program code is further configured to utilize a least recently used (LRU) algorithm to determine how long data pages are retained in the cache, the LRU algorithm taking into account the cost of the data pages.

15. An apparatus for retaining data pages in a cache, the apparatus comprising:
    at least one processor;
    at least one memory device coupled to the at least one processor and storing instructions for execution on the at least one processor, the instructions causing the at least one processor to:
    store a plurality of data pages in a cache;
    calculate, for each data page of the plurality of data pages, a cost associated with promoting the data page from persistent storage media to the cache, the cost taking into account any data transformation that is needed to promote the data page from the persistent storage media to the cache;
    retain each data page in the cache for an amount time that is associated with its cost; and
    as the cache fills, reduce the effect that the cost has on data page retention in the cache.

16. The apparatus of claim 15, wherein the data transformation includes at least one of encryption and decryption.

17. The apparatus of claim 15, wherein the data transformation includes at least one of compression and decompression.

18. The apparatus of claim 15, wherein the cost associated with each data page is represented as a score for each data page.

19. The apparatus of claim 15, wherein data pages with a higher cost are retained in the cache longer than data pages with a lower cost.

20. The apparatus of claim 15, wherein the instructions further cause the at least one processor to, as the cache fills to a threshold, reduce the effect that cost has on the amount of time that data pages are retained in the cache.

\* \* \* \* \*